(12) United States Patent
Millsaps, Jr.

(10) Patent No.: US 7,661,271 B1
(45) Date of Patent: Feb. 16, 2010

(54) INTEGRATED ELECTRIC GAS TURBINE

(75) Inventor: Knox T. Millsaps, Jr., Monterey, CA (US)

(73) Assignee: The United States of America as represented by the Secretary of the Navy, Washington, DC (US)

( * ) Notice: Subject to any disclaimer, the term of this patent is extended or adjusted under 35 U.S.C. 154(b) by 594 days.

(21) Appl. No.: 11/086,734

(22) Filed: Mar. 18, 2005

(51) Int. Cl.
*F02C 7/26* (2006.01)

(52) U.S. Cl. .............................. 60/786; 60/788; 290/52

(58) Field of Classification Search .................. 60/788, 60/802, 39.162, 268, 726, 786, 805; 290/52, 290/36 R; 415/91
See application file for complete search history.

(56) References Cited

U.S. PATENT DOCUMENTS

| | | | | |
|---|---|---|---|---|
| 4,302,683 A * | 11/1981 | Burton | ......................... | 290/4 R |
| 4,309,621 A * | 1/1982 | Litz | ............................. | 290/52 |
| 5,376,827 A * | 12/1994 | Hines | ........................... | 290/52 |
| 5,722,229 A * | 3/1998 | Provost | ........................ | 60/785 |
| 5,809,772 A * | 9/1998 | Giffin et al. | ................ | 60/226.1 |
| 6,763,652 B2 * | 7/2004 | Baughman et al. | ........ | 60/39.162 |
| 2004/0025490 A1 * | 2/2004 | Paul | ........................... | 60/39.43 |
| 2004/0123603 A1 * | 7/2004 | Care et al. | ..................... | 60/801 |
| 2005/0056021 A1 * | 3/2005 | Belokon et al. | ................ | 60/772 |
| 2005/0284150 A1 * | 12/2005 | Dittmar et al. | ................ | 60/788 |
| 2006/0150633 A1 * | 7/2006 | McGinley et al. | ............. | 60/773 |

\* cited by examiner

*Primary Examiner*—Michael Cuff
*Assistant Examiner*—Phutthiwat Wongwian
(74) *Attorney, Agent, or Firm*—Donald E. Lincoln; Lisa A. Norris

(57) ABSTRACT

An integrated electric gas turbine comprises a compressor that includes a plurality of airfoils. An electric motor is arranged to drive the compressor, and a combustor is arranged to receive compressed air from the compressor and further arranged to receive a fuel input. A turbine is arranged to receive the combustion gases from the combustor. A generator is integrated with the turbine and arranged to provide a power output. A controller is connected between the generator and the electric motor and arranged to direct a portion of the power output from the generator to the electric motor.

10 Claims, 2 Drawing Sheets

INTEGRATED ELECTRIC GAS TURBINE

BACKGROUND OF THE INVENTION

1. Field of the Invention

This invention relates generally to rotating electric machinery and particularly to gas turbine engines.

2. Description of the Prior Art

A gas turbine engine constructed in accordance with prior art technology transfers power extracted by the turbine to a compressor by means of a mechanical shaft. In steady state operation this requires that the physical speed of the compressor and turbine be identical unless gearing is used. If several spools are used, the power and speed must be matched for each shaft, which imposes strict design constraints and limits the engine's operability.

Several problems, such as low component efficiency, rotating stall and surge, etc., can arise in a gas turbine during operation at off-design conditions and transient conditions. These problems are known to occur frequently while a gas turbine is starting up. Start-up problems are mainly due to the stages not being properly matched, which creates large negative and/or positive airfoil incidences at various blade rows through the engine. The rotational speed and power matching constraints of the turbine(s) and compressor(s) are two of the factors that create this problem.

Multistage turbomachines, such as compressors or turbines, are usually made of alternating rotating (rotor) and stationary (stator) rows of airfoils or similar turning elements. The rotor blade elements add (compressor) or extract (turbine) energy from the working gas while the static rows simply redirect the flow for the next rotating row. The presence of the stator rows, which do not contribute to the energy exchange, reduces the efficiency and increases the size, particularly the length, of the component. Eliminating these rows can increase turbomachine stage efficiencies from approximately 90% to 95% and significantly reduce the component length.

In many applications of gas turbines, such as electric power production or propulsion (non-exhaust gas driven), a separate generator is used to convert the shaft power to electric power, which requires a linkage between the shaft and the generator. This can significantly increase the overall length of the gas turbine/generator assembly.

Ordinarily a separate starter mechanism is required for a gas turbine. In order to start a gas turbine the starter mechanism is necessary to supply power to the shaft. The starter mechanism is then disengaged after self-sustaining operation is obtained.

In a typical gas turbine, the compressor and turbine are co-linear due to the shafting. For some applications (such as ship-board installation) it could be advantageous to relax this constraint.

Several techniques are used to improve starting and off design performance of gas turbines including using multiple shafts (typically two or three), interstage compressor bleeds, and variable stator geometry. Variable rotor geometry has also been proposed.

Counter-rotating spools are sometimes used to eliminate the intermediate stator. This increases the efficiency, power to weight ratio and reduces cooling flows in turbines. However, many shafts (with great mechanical complexity) are necessary to eliminate all the stators in a high-pressure ratio machine.

SUMMARY OF THE INVENTION

It is an object of the invention to provide an integrated electric gas turbine for shipboard or other environments that provides improved spatial utilization.

Another object of the invention is to provide an integrated electric gas turbine engine that is capable of starting without requiring a complex gearing device.

Still another object of the invention is to provide an integrated electric gas turbine engine that has reduced length, volume, weight and cost when compared to prior gas turbine structures.

Accordingly, an integrated electric gas turbine according to the invention comprises a compressor that includes a plurality of airfoils, and electric motor connected to the compressor and arranged to drive the compressor, a combustor arranged to receive compressed air from the compressor and further arranged to receive a fuel input such that combustion occurs in the combustor and produces combustion gases, a turbine arranged to receive the combustion gases from the combustor, a generator that is integrated with the turbines and arranged to provide a power output, and a controller connected between the generator and the electric motor and arranged to direct a portion of the power output from the generator to the electric motor.

The integrated electric gas turbine according to the invention may be arranged to provide the power output in electrical form.

Alternatively, the integrated electric gas turbine may provide the power output as thrust.

The compressor preferably includes a plurality of rotating rings of airfoils that function as both compressor rows and electric motor armatures.

The turbine preferably includes turbine airfoils and generator field windings.

The features of the invention may be more fully understood and appreciated by referring to the drawings described briefly below and by referring to the detailed description of the invention.

DETAILED DESCRIPTION OF THE INVENTION

Figure 1:
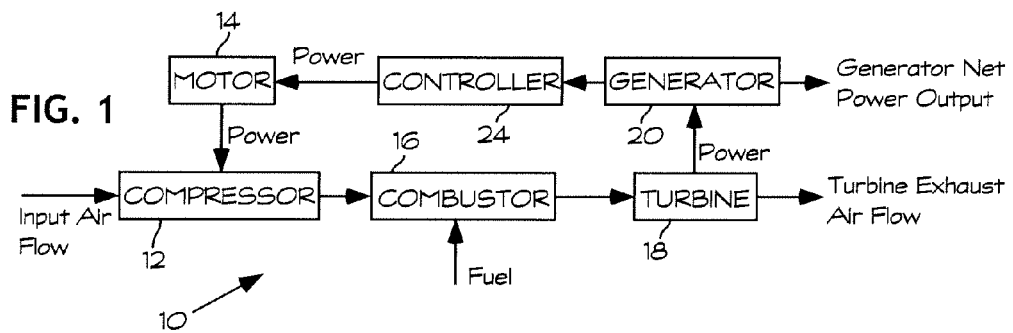
FIG. 1 is a block diagram showing air, fuel and power flow in an integrated electric gas turbine according to the present invention.
Figure 2:
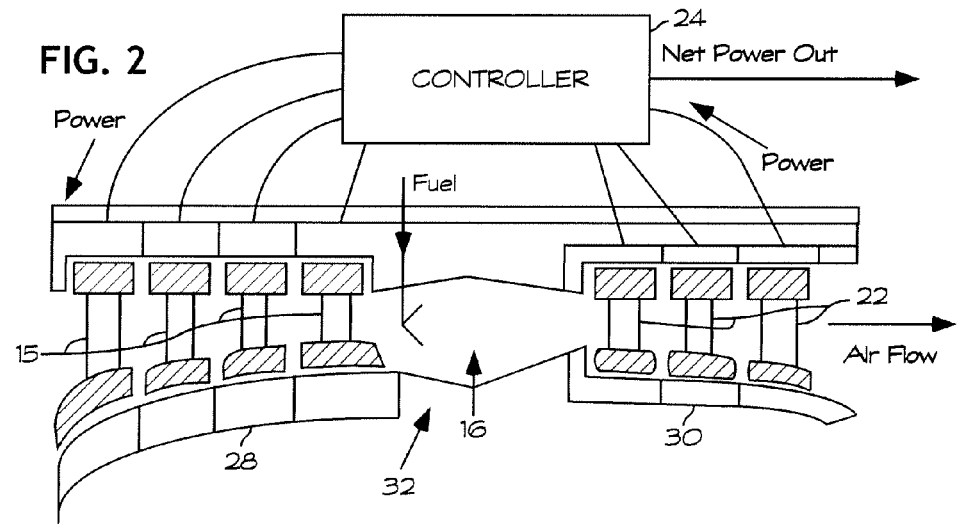
FIG. 2 illustrates structural features of the invention.
Figure 4:
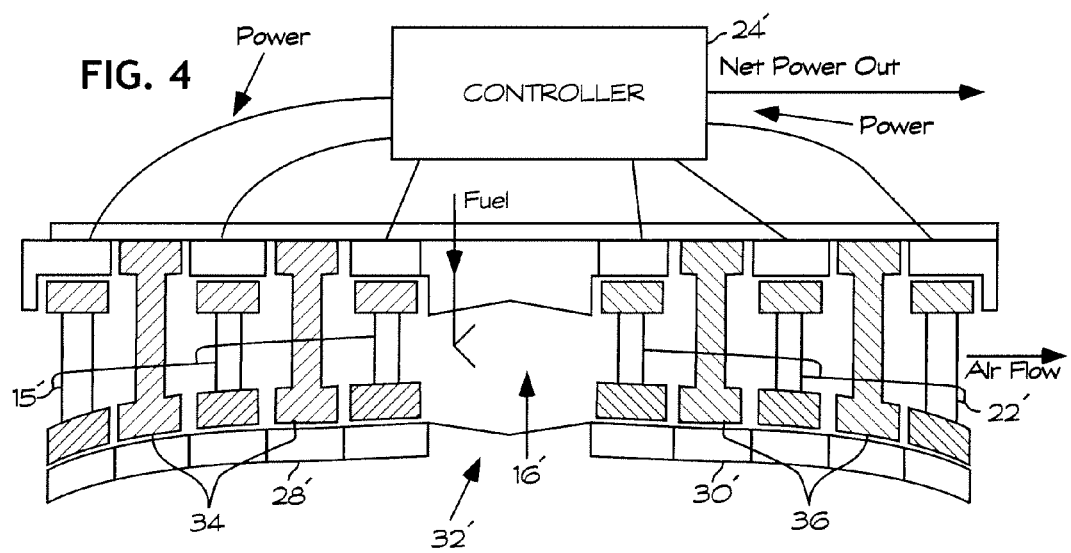
FIG. 4 illustrates structural features of the invention including stators in accordance with another embodiment.

FIG. 1 is a block diagram that illustrates the basic structural features of an integrated electric gas turbine 10 according to the present invention. As shown in FIG. 1, air enters a compressor 12, which may comprise a series of rotating rings of cascaded airfoils 15, shown in FIG. 2, driven by an integrated electric motor structure 14. Either conventional or levitating magnetic bearings (not shown) can be used to support the rotating airfoil rings 15, which act as both compressor rows and electric motor armatures. For each row, power is transferred to the inside, outside or both surfaces of the ring via electromagnetic induction just as in a conventional electric motor rotor. The airfoil rings 15 act to compress the gas just as in a conventional compressor. The rings 15 can be of axial, mixed or radial flow design. Any type of particular electric motor design can be used, including conventional or superconducting, A.C. or D.C., synchronous or induction, 2-pole, 4-pole with brushes or brushless, etc. This design can be achieved with or without stators between successive rotating rows. FIG. 2 illustrates an embodiment without stators between successive rotating rows, and FIG. 4 illustrates an alternate embodiment with stators between successive rotating rows. However, a great efficiency advantage as well as a reduction in length can be realized by eliminating the stator rows.

Air exits the compressor 12 and enters a combustor 16 where fuel is mixed with the compressed air. Combustion occurs, and the gases resulting from the combustion exit the combustor 16 and then enter a turbine 18 that is mechanically integrated with an electric generator 20. The turbine 18, like the compressor 12, includes a series of rotating rows of airfoils 22 that may be counter-rotating and magnetically levitated. For thrust-type engines, the power extracted by the electric generator 20 from the expanding combustion gases is used to feed the power requirements of the compressor 12 as determined by a controller 24.

Figure 3:
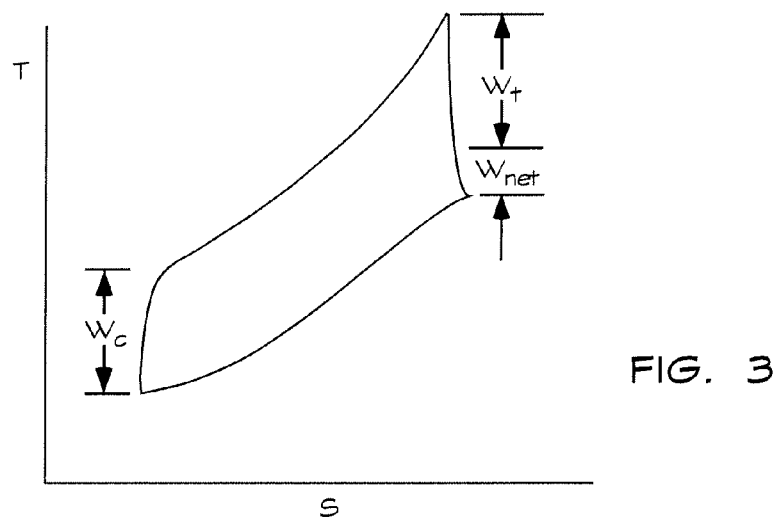
FIG. 3 is a temperature-entropy diagram for the invention.

Referring to FIG. 3, the specific power the turbine 18 must extract for the compressor 12 is approximately, $$w_t = \frac{w_c}{\eta_g \eta_m (1+f)}$$

where $w_c$ is the mechanical specific work of the compressor 12, $\eta_g \eta_m$ are the generator and motor electrical efficiencies, respectively, and f is the fuel/air ratio. For a turboshaft type engine, only a small fraction of the power extracted by the turbine 18 is used to supply the power requirements of the compressor 12. The remaining energy, $\eta_g w_{net}$, is available in electrical form. For thrust engines, the remaining energy, $w_{net}$, is available for thrust.

FIG. 2 schematically illustrates the integrated electric gas turbine 10. The compressor 12 has compressor airfoil rings 15. The turbine 18 has turbine airfoils 22. FIG. 2 also shows field windings 28 for the motor 14 and the generator field windings 30 for the generator 20. A fuel supply system 32 supplies fuel to the combustor 16. As illustrated, no shaft connects airfoil rings 15 of compressor 12 to airfoils 22 of turbine 18.

For starting, electrical power is fed directly into the compressor 12 from an external source (not shown). The latter compressor stages are controlled to spool up first allowing for better stage matching. No separate starter is required. Integration of the turbine with the generator in accordance with the present invention can reduce the size (length and volume), weight and cost of the machinery.

FIG. 4 schematically illustrates another embodiment of the integrated electric gas turbine 10' including stators. The compressor 12' has compressor airfoil rings 15' and stators 34 between successive rotating rows of compressor airfoil rings 15'. The turbine 18' has turbine airfoils 22' and stators 36 between successive rotating rows of turbine airfoils 22'. FIG. 4 also shows field windings 28' for the motor 14' and generator field windings 30' for the generator 20'. A fuel supply system 32' supplies fuel to the combustor 16'.

The structures and methods disclosed herein illustrate the principles of the present invention. The invention may be embodied in other specific forms without departing from its spirit or essential characteristics. The described embodiments are to be considered in all respects as exemplary and illustrative rather than restrictive.

What is claimed is:

1. An integrated electric gas turbine, comprising:
    a compressor comprising a plurality of separately controllable rotating rings of cascaded airfoils;
    an electric motor integrated with the compressor and arranged to drive the compressor;
    a combustor arranged to receive compressed air from the compressor and further arranged to receive a fuel input such that combustion occurs in the combustor and produces combustion gases for driving a turbine;
    a turbine arranged to receive the combustion gases from the combustor, the turbine comprising a plurality of separately rotating rings of cascaded turbine airfoils, the plurality of separately rotating rings of cascaded turbine airfoils not connected by a shaft to the plurality of separately controllable rotating rings of cascaded airfoils of the compressor;
    a generator that is integrated with the turbine and arranged to provide a power output; and
    a controller connected between the generator and the electric motor, the controller arranged to receive the portion of the power output from the generator and to direct a the portion of the power output from the generator to the electric motor.

2. The integrated electric gas turbine of claim 1 wherein the power output is available in electrical form.

3. The integrated electric gas turbine of claim 1 wherein the power output is available for thrust.

4. The integrated electric gas turbine of claim 1 wherein the plurality of separately controllable rotating rings of cascaded airfoils function as both compressor rows and electric motor armature.

5. The integrated electric gas turbine of claim 1 wherein the turbine further comprises:
    generator field windings.

6. The integrated electric gas turbine of claim 1, the compressor further comprising:
    one or more rows of stators which are static airfoils, wherein each of the one or more rows of stators separates successive controllable rotating rings of cascaded airfoils.

7. The integrated electric gas turbine of claim 1, wherein each of the plurality of separately controllable rotating rings of cascaded airfoils is counter-rotating.

8. The integrated electric gas turbine of claim 1, wherein each of the plurality of rotating rings of cascaded turbine airfoils is counter-rotating.

9. The integrated electric gas turbine of claim 7, wherein each of the plurality of separately rotating rings of cascaded turbine airfoils is counter-rotating.

10. The integrated electric gas turbine of claim 1, wherein each of the plurality of separately controllable rotating rings of cascaded airfoils are controlled to allow latter compressor stages to spool up first to provide better stage matching without requirement for a separate starter.

* * * * *